US012663323B2

(12) United States Patent
Voisin

(10) Patent No.: US 12,663,323 B2
(45) Date of Patent: Jun. 23, 2026

(54) DEVICE FOR DETECTING SEPARATION AND ASSEMBLY FOR SUCH A DEVICE

(71) Applicant: BLADE SENSE SAS, La Forêt Fouesnant (FR)

(72) Inventor: Dimitri Marcel Voisin, La Foret Fouesnant (FR)

(73) Assignee: BLADE SENSE SAS, La Foret Fouesnant (FR)

( * ) Notice: Subject to any disclaimer, the term of this patent is extended or adjusted under 35 U.S.C. 154(b) by 339 days.

(21) Appl. No.: 18/566,595

(22) PCT Filed: Jun. 23, 2022

(86) PCT No.: PCT/EP2022/067116
§ 371 (c)(1),
(2) Date: Dec. 1, 2023

(87) PCT Pub. No.: WO2022/268929
PCT Pub. Date: Dec. 29, 2022

(65) Prior Publication Data
US 2024/0280421 A1 Aug. 22, 2024

(30) Foreign Application Priority Data

Jun. 23, 2021 (FR) ...................................... 2106658

(51) Int. Cl.
*G01L 1/12* (2006.01)
*G01M 5/00* (2006.01)
(52) U.S. Cl.
CPC ........... *G01L 1/127* (2013.01); *G01M 5/0016* (2013.01); *G01M 5/0041* (2013.01); *G01M 5/0091* (2013.01)

(58) Field of Classification Search
CPC ...... G01L 1/127; G01L 1/044; G01M 5/0016; G01M 5/0041; G01M 5/0091; G01M 5/0033
See application file for complete search history.

(56) References Cited

U.S. PATENT DOCUMENTS 7,468,664 B2 * 12/2008 Daughton ............ G01R 33/093
340/568.1
7,896,614 B2 * 3/2011 Fisher ................... F03D 7/0256
416/61

(Continued)

FOREIGN PATENT DOCUMENTS

EP 2246559 B1 7/2015
EP 3798596 A1 3/2021

OTHER PUBLICATIONS

Hannes Sturm et al., "Boundary Layer Separation and Reattachment Detection on Airfoils by Thermal Flow Sensors," SENSORS, Jan. 1, 2012, pp. 14292-14306, vol. 12.

*Primary Examiner* — Freddie Kirkland, III
(74) *Attorney, Agent, or Firm* — H&I PARTNERS; Chai Im; C. Andrew Im

(57) ABSTRACT

A device for detecting separation in an aerodynamic or hydrodynamic profile having a one-piece structure with a flexible and deformable strip extending between the first end and the second end. The second end of the strip being free. A mounting plate configured to be attached to the profile. The mounting plate includes the first end of the flexible and deformable strip. The mounting plate also includes a circuit board and at least one separation sensor having a magnet generating an electrical signal which indicates a separation value.

9 Claims, 7 Drawing Sheets

(56) References Cited

U.S. PATENT DOCUMENTS

| | | | | |
|---|---|---|---|---|
| 8,024,974 | B2* | 9/2011 | Bharti | A61B 5/4818 |
| | | | | 73/591 |
| 8,516,899 | B2* | 8/2013 | Obrecht | B64C 23/00 |
| | | | | 73/861 |
| 10,955,306 | B2* | 3/2021 | Cadugan | G01L 27/007 |
| 11,467,074 | B2* | 10/2022 | Zanichelli | G01L 1/122 |
| 2012/0086209 | A1* | 4/2012 | Obrecht | F03D 17/00 |
| | | | | 290/55 |
| 2014/0163606 | A1* | 6/2014 | Ragg | A61F 13/0253 |
| | | | | 606/201 |
| 2020/0333203 | A1* | 10/2020 | Cadugan | G01L 9/10 |
| 2021/0096049 | A1 | 4/2021 | Zanichelli | |

* cited by examiner

DEVICE FOR DETECTING SEPARATION AND ASSEMBLY FOR SUCH A DEVICE

RELATED APPLICATIONS

This application is a § 371 application of PCT/EP2022/067116 filed Jun. 23, 2022, which claims priority from French Patent Application No. 2106658 filed Jun. 23, 2021, each of which is incorporated herein by reference in its entirety.

TECHNICAL FIELD OF THE INVENTION

The present invention relates to a device for detecting separation and assembly for such a device.

The fields covered by the invention are, by no means exhaustively, the following: all sectors of mechanics in the air with aeronautics, on water and in water with the maritime sector, on land with land transport, and civil engineering.

Of course, other fields in which any aerodynamic or hydrodynamic profile having a flow separation sensor designed in accordance with the present invention are also covered.

BACKGROUND OF THE INVENTION

In nature, aerodynamic and hydrodynamic profiles rarely encounter laminar flows, i.e., when the streamlines are perfectly aligned with the profile.

When the boundary layer is subjected to an adverse pressure gradient, said boundary layer becomes separated.

Once the boundary layer is detached from the surface, said boundary layer gives way to a return flow.

The position of the separation point thus determines the aerodynamic lift force.

In addition, the closer the separation point is to the leading edge, the greater the recirculation, which leads to a reduction in lift leading to stalling of the profile when the angle of incidence, also known as the angle of attack, is too high.

The stall is therefore the limit of the increase in the force exerted on the profile, made up of the force of lift and drag, depending on the angle of attack. The flow velocity is not the same on either side of the profile, resulting in a pressure difference between the upper and lower sides of said profile. The greater the angle of attack, the greater the upward force.

The stall of the profile therefore corresponds to the more or less sudden loss of lift, caused by the flow separation on the upper part of the profile.

Two types of stalls are therefore possible: static stall, which occurs in the case of stationary flows above a certain angle of incidence, and dynamic stall, when the profile continues to lift after exceeding the static stall angle, due to the rapid variations in the angle of incidence.

In the case of wind turbine blade profiles, the close environment and the turbulence of the atmospheric boundary layer mean that the wind blows randomly over the turbine. The numerous aerodynamic instabilities cause the flow to become separated, leading to stall, which in turn causes fluctuations in the mechanical loads on the wind turbine, particularly on the blades.

The stall leads to a loss of lift because when the profile stalls and is therefore sharply inclined, the angles of attack are greater and the fluid is no longer able to follow the imposed trajectories, which leads to a reduction in the deformation of the fluid trajectory. There is then less acceleration of the fluid on the upper surface of the profile, implying a reduction in negative pressure. The stall also leads to increased drag, as well as noise pollution and structural fatigue of the profile.

Various techniques for detecting stalls already exist.

In order to detect stalls and recoveries, it is necessary to detect the state of the flow, i.e., the ability to detect the zone of separation of the flow. Detection is then possible thanks to attachments such as threads (wool, fabric, magnetic tape, etc.) that are light enough not to disrupt the flow and that follow the flow at the location of the sensor.

FIG. 1 shows three curves: the first graph at the top shows the curve of the lift coefficient of the separation sensor signal as a function of the angle of attack on an aerodynamically/hydrodynamically stable profile, the second graph in the middle shows the curve of the moving average of the separation sensor signal as a function of the angle of attack on an aerodynamically/hydrodynamically stable profile, and the third graph at the bottom shows the moving standard deviation as a function of the angle of attack on an aerodynamically/hydrodynamically stable profile.

The abscissa of the first curve is called Cl for "Lift Coefficient" and the ordinate is called AoA for "Angle of Attack". The shape of this first curve increases during phase (a) when the values of the angle of attack are low, then the shape of the first curve continues to increase and stabilizes during phase (b), before increasing again during phase (c), following which the first curve disappears during phase (d). Above a certain angle of attack value, the lift curve no longer appears, meaning that the stall phenomenon has taken place. This angle of attack value corresponds to the maximum lift where the negative pressure on the upper part of the profile suddenly decreases as a result of the air streams separating and the profile stalls.

The abscissa of the second curve corresponds to the value of the theta angle ($\theta$) and more specifically to the moving average of the angle between the tail and the profile, the ordinate corresponds to the angle of attack value. The shape of the second curve is straight, stable and with a relatively zero moving average during phase (a) when the values of the angle of attack are low, then said shape of the second curve increases and then decreases forming a bell curve during phase (b), before once again having a bell curve during phase (c) but with higher values than in phase (b), with the curve finally stabilizing again during phase (d) and becoming straight again with a moving average close to 0.

The abscissa of the third curve corresponds to the sigma value and more specifically to the moving standard deviation of the angle between the tail and the profile, the ordinate corresponds to the angle of attack value. The shape of the third curve is straight, stable and with a relatively zero moving average during phase (a) and phase (b), then said shape of the third curve increases and then decreases forming a bell curve during phase (c) similar to the bell curve of the second curve during phase (c), with the curve finally stabilizing again during phase (d) and becoming straight again with a standard deviation close to 0.

The average and moving standard deviation of the sensor signal can be used to monitor and anticipate changes in lift over the four phases.

The angle of attack corresponds to the angle formed by the chord connecting the leading edge and the trailing edge, with the speed of the air upstream. The greater the angle of attack, the more the air streams are deflected by the profile. Once the stall angle has been exceeded (d), the aerodynamic performance of the profile is severely impaired.

Certain prior art documents propose stall detection devices. For example, publication document EP2246559 is known.

This document describes an invention relating to a wind turbine blade with an electric stall sensor designed on at least one of said low-pressure surface of the blade or said high-pressure surface of the blade to detect backflow in a stall condition at said respective pressure surface.

The separation sensor comprises: a power supply; a flap designed to pivot relative to the pressure surface; and a sensor circuit which responds to the movement of said flap between said first and second positions and generates a corresponding electrical signal which indicates a separation condition.

The drawback of this type of solution is the loss of performance associated with the use of a non-deformable flap, which by its very nature is intrusive for the flow under study. The use of a non-deformable flap causes an increase in drag, aerodynamic/hydrodynamic instability, and early onset of cavitation.

Another drawback is the mechanical fragility associated with the pivot link, which leads to an increase in the coefficient of friction of the pivot, resulting in sensor drift and reduced reliability compared with a solution without moving parts. Sensors with a pivot axis are therefore not a viable solution in the long term.

In addition, the use of a non-deformable flap does not allow a detailed description of the separation due to the break in the curve on the profile.

Another drawback of pivot axis flap-based sensors is that they are difficult to install one behind the other along the chord, as disturbances from upstream sensors encourage separation on downstream sensors.

SUMMARY AND OBJECT OF THE INVENTION

The present invention aims to overcome these drawbacks with a completely novel approach.

More specifically, one object of the invention is to provide a separation detection device composed of a strip of flexible and deformable material without a moving part, enabling detection of the separation, optimization of the control of the angle of incidence, and detection of the misalignment of the wind turbines according to the yaw angle.

In particular, one object of the invention is to provide a technique that does away with the need for any other complex control system; the implementation of the present invention makes it possible to integrate the separation sensor within the profile in order to be as unobtrusive as possible and not to impair the aerodynamic or hydrodynamic performance of the profile.

Another object of the invention is to provide a technique that is inexpensive to implement and does not require any particular maintenance.

One object of the invention is to provide a technique that can be easily adapted to existing systems.

These objects, as well as others that will appear later on, are achieved, according to a first aspect, with the help of a device for detecting separation in an aerodynamic or hydrodynamic profile, comprising a one-piece structure notable in that it has:

a strip of flexible and deformable material made from silicone extending between a first end and a second end, the second end being free;

a mounting plate designed to be attached to a profile, the mounting plate having the first end of the flexible and deformable strip, said mounting plate also having a circuit board and at least one separation sensor comprising a magnet generating an electrical signal which indicates a separation value along three orthogonal axes; the circuit board attached to the mounting plate transmits the electrical signal by a radio transmission system or by wired means.

Thanks to these features, the separation sensor has the advantage of being perfectly integrated into the aerodynamic/hydrodynamic profile so as not be intrusive and disturb the flow by increasing drag.

The strip itself is made from a flexible and deformable material.

The present invention broadens the scope of application and can therefore be used to detect frost and ice, to detect a structural fault as well as to detect noise pollution. The present invention therefore works for any type of fluid.

Said invention is suitable for all types of aerodynamic profiles and features (aircraft wings, flexible sails, rigid sails, wind turbine blades, helicopter blades, drone blades, ailerons, empennages, car spoilers, engineering structures, etc.) and for all hydrodynamic profiles and features (foils, rudders, keels, hulls, etc.). The separation sensor can be fully integrated into the profile and there is therefore no modification to the geometry of the profile when there is no separation.

The sensor has a flexible and deformable tail that allows it to be deployed with an overlap, like a bird's wing. Said tail sensor is based on the principle of the remiges and rectrices, the feathers on the wings and tail that enable birds to fly.

Detecting fluid separation by means of tail movements using the Hall effect sensor principle or another electromagnetic principle (eddy current inductive sensor, capacitive sensor, etc.) by measuring the angle between the sensor tail and the tangent of the profile, has the advantage of better accuracy compared to the All or Nothing type sensors.

The use of the Hall effect sensor ensures better measuring accuracy, reproducibility and lower power consumption compared to the prior art.

Another advantage of the present invention is that it minimizes the line break of the profile.

Non-intrusive sensors feature a strip made of flexible materials with shape memory, offering greater flexibility and lightness.

The strip in the present invention is made from silicone and has a Shore value comprised between 20 and 100. The hardness scale is: Shore A for soft materials, and Shore D for hard materials. The choice of Shore hardness scale for the strip and therefore its flexibility depends on the type of fluid. For aerodynamic applications where the fluid in question is air, Shore A or B materials are used, whereas for hydrodynamic applications where the fluid in question is water, Shore C or D materials are used.

The present invention also makes it possible to have a scale-like arrangement, i.e., allowing the flexible and deformable strips to overlap one another, like fish scales or bird feathers. The separation sensor with flexible and deformable strips is therefore based on the principle of the remiges and rectrices, the feathers on the wings and tail that enable birds to fly.

The present invention allows the position of the tail to be tracked at a solid angle, giving access to the direction of flow.

The present invention is highly suited to deformable profiles with a variable geometry (thin or thick profiles, whether inflatable or not) or to rigid profiles.

The present invention allows measurements to be taken with very little effect from temperature and through walls.

The invention is advantageously implemented according to the embodiments and variants set out below, which are to be considered individually or in any technically effective combination.

In one embodiment, said device also has a battery positioned internally or externally to said device, said battery serving as power supply and being connected to the circuit board.

In one embodiment, the device forms a one-piece structure made up of three parts: one part has the flexible and deformable strip, a second part has said mounting plate, a third part has a protective shell, said protective shell covering said mounting plate.

In one embodiment, the separation sensor uses the principle of Hall effect electromagnetism or inductive eddy current.

Thanks to these arrangements, the electromagnetic principle makes it possible to track the angle of the position of the flexible and deformable strip in relation to the profile.

In one embodiment, the flexible and deformable strip moves from a first position, known as a lowered position, to a second position, known as a raised position.

Thanks to these arrangements, the flexible and deformable strip can be moved from one position to another and makes is possible to follow the profile separation. The second end is free.

In one embodiment, the silicone of the strip has a Shore value comprised between 20 and 100.

In one embodiment, the present invention has a plurality of devices for detecting separation according to one of the preceding claims.

Thanks to these arrangements, the plurality of separation sensors provides better accuracy and a more detailed description of the curve of the flexible and deformable strip.

BRIEF DESCRIPTION OF THE FIGURES

Other advantages, aims and features of the present invention will become apparent from the description below, provided for explanatory purposes and in no way limiting, with reference to the appended drawings, in which.

DESCRIPTION OF THE EMBODIMENTS

Figure 1:
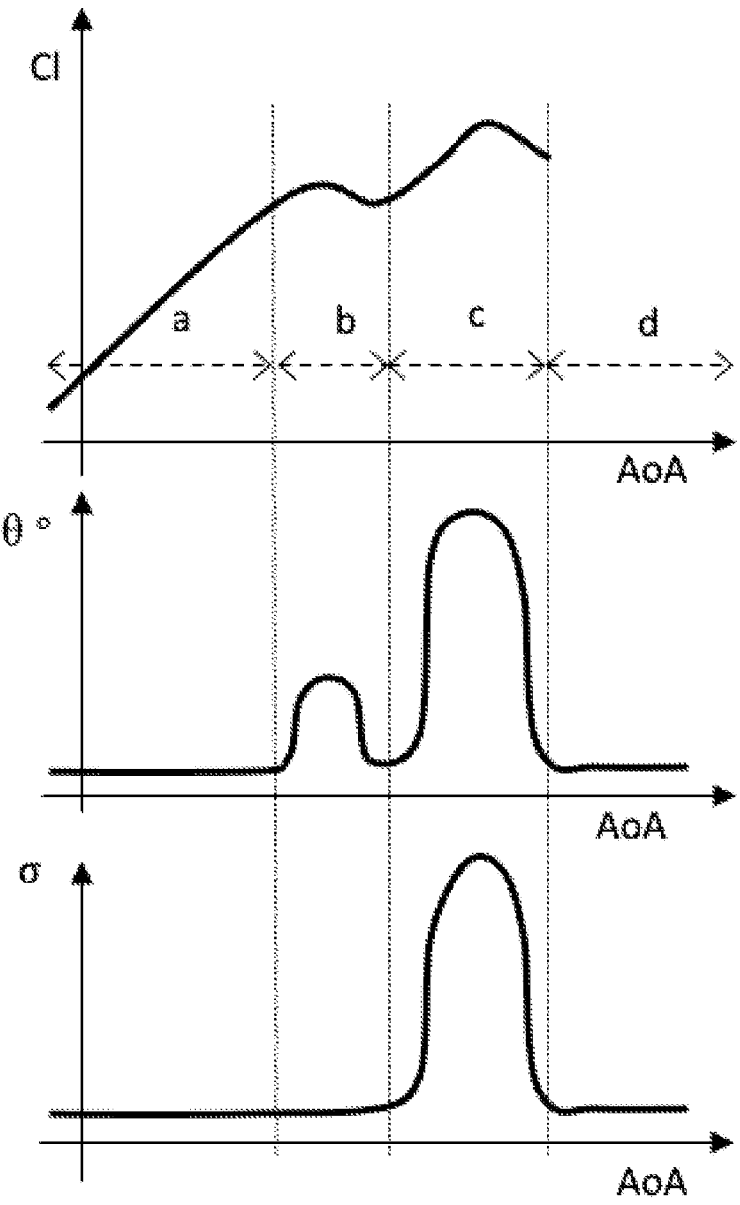
FIG. 1 described above shows three graphs of the lift coefficient, of the moving average of the angle between the tail and the profile, and of the moving standard deviation as a function of the angle of attack, explaining the separation sensor signal as a function of the angle of attack.

FIG. 1 has been described above.

Figure 2:
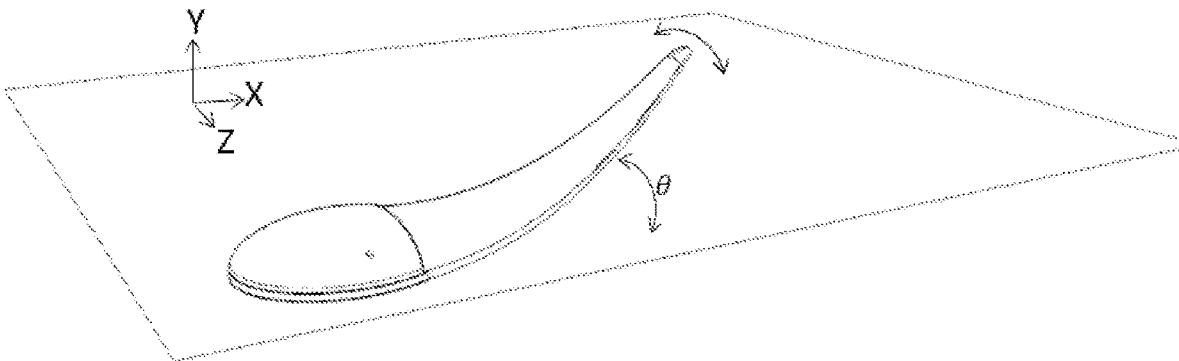
FIG. 2 shows a top view of a separation detection device integrated into the profile, and showing the theta angle (0) corresponding to the moving average of the angle between the tail and the profile.

FIG. 2 shows a top view of a separation detection device integrated into the profile, and showing the theta angle (θ) corresponding to the moving average of the angle between the tail and the profile.

The measurement of the moving average of the angle between the tail and the profile can be used to monitor and anticipate changes in lift.

FIG. 2 shows the three orthogonal axes: X; Y and Z. In this way, it is possible to have a measurement value in different directions, making the measurement more accurate than in a single direction.

Figure 3:
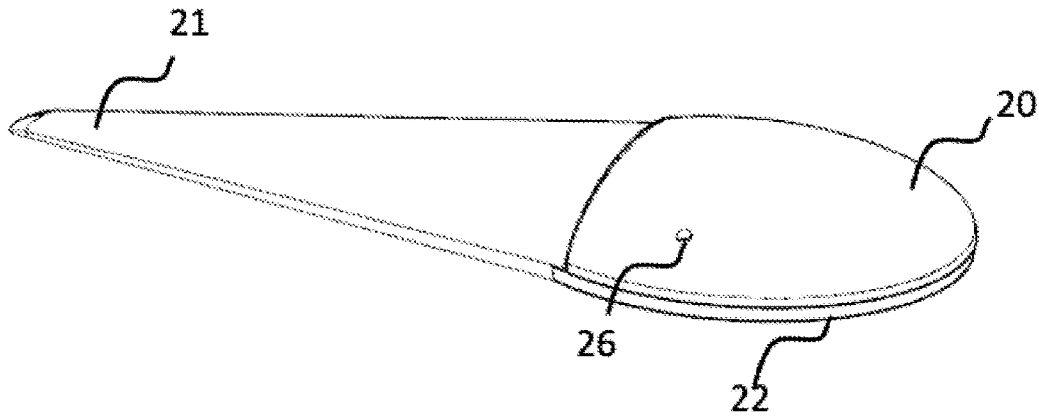
FIG. 3 shows a top view of the separation detection device according to one embodiment.

FIG. 3 shows a top view of the separation detection device formed by the flexible and deformable strip 21 subjected to the pressure field and corresponding to the tracer of the flow separation on the profile, and the protective shell 20 assembled to a mounting plate 22, the assembly being held by a closure screw 26.

The term mounting plate is understood to mean the support on which the device is mounted.

According to one embodiment, the protective shell 20 and the mounting plate 22 are made from a vacuum-cast polyurethane resin for prototype and technical parts, with mechanical properties similar to thermoplastic polymers such as acrylonitrile butadiene styrene, which goes by the acronym ABS and is a rigid, light, impact-resistant thermoplastic polymer with a flexural modulus equal to or greater than 2000 MPa-90° C. glass transition temperature (Tg).

Figure 4:
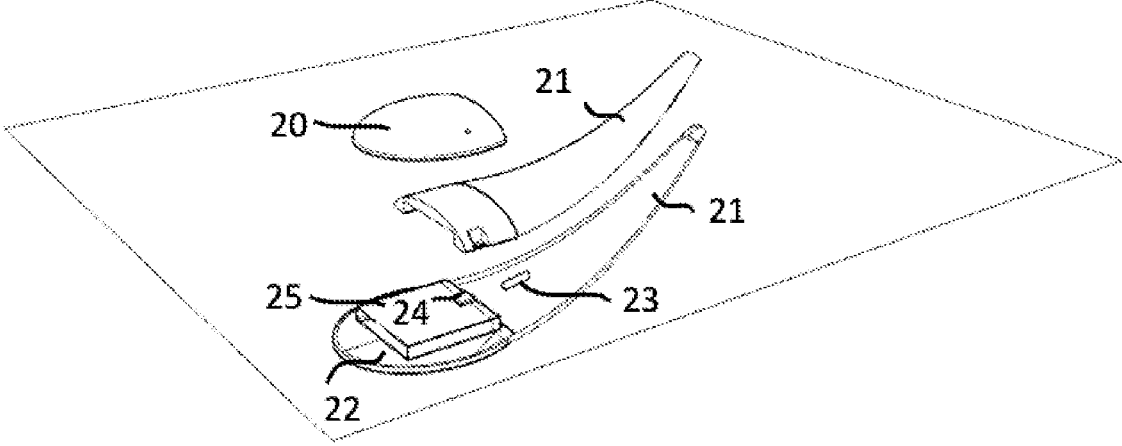
FIG. 4 shows an exploded view of a separation detection device, where the sensor is integrated into the profile.

FIG. 4 shows an exploded view of a separation detection device made up of: the protective shell 20, the flexible and deformable strip 21, a magnet 23 suitable for measuring the movement of the flexible strip 21, a mounting plate 22 on which a separation sensor 24 is mounted, itself mounted on a circuit board, said circuit board 25 connects the Hall effect sensor 24 to a radio transmission system (example 2.4 Ghz), not shown, or in another embodiment, the signal is transmitted by wire, said circuit board 25 is connected to a power supply, not shown, for example an internal battery, or in another embodiment, the separation sensor 24 is powered by an external source.

The mounting plate 22 is glued to the surface of the profile using a two-component polyurethane adhesive.

The sensor 24 is used to monitor the shape and position of the strip 21 relative to the profile.

The circuit board 25 is encapsulated in a dielectric resin for a perfect seal.

In one embodiment, for a separation sensor 24 using the Hall effect principle, the magnet 23 is of the neodymium or ferrite, SmCo, NdFeB or other type.

SmCo magnets (the acronym for samarium-cobalt magnet) is a type of permanent magnet made from an alloy of samarium and cobalt. The same goes for NdFeB magnets (the acronym for neodymium magnet), which are permanent magnets made from an alloy of neodymium, iron and boron.

Figure 5:
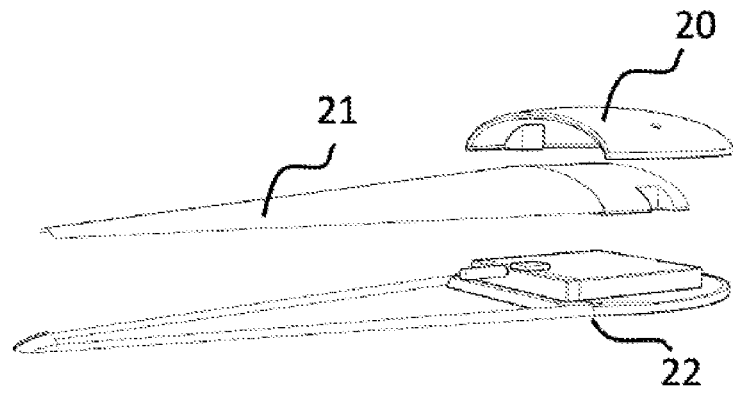
FIG. 5 shows an exploded perspective view of a separation detection device.

FIG. 5 shows an exploded perspective view of the parts making up the one-piece structure formed by the separation detection device, said separation sensor is formed by the assembly of the strip 21, the mounting plate 22, and the protective shell 20 covering part of the mounting plate 22 where the sensor 24 and circuit board are.

Figure 6:
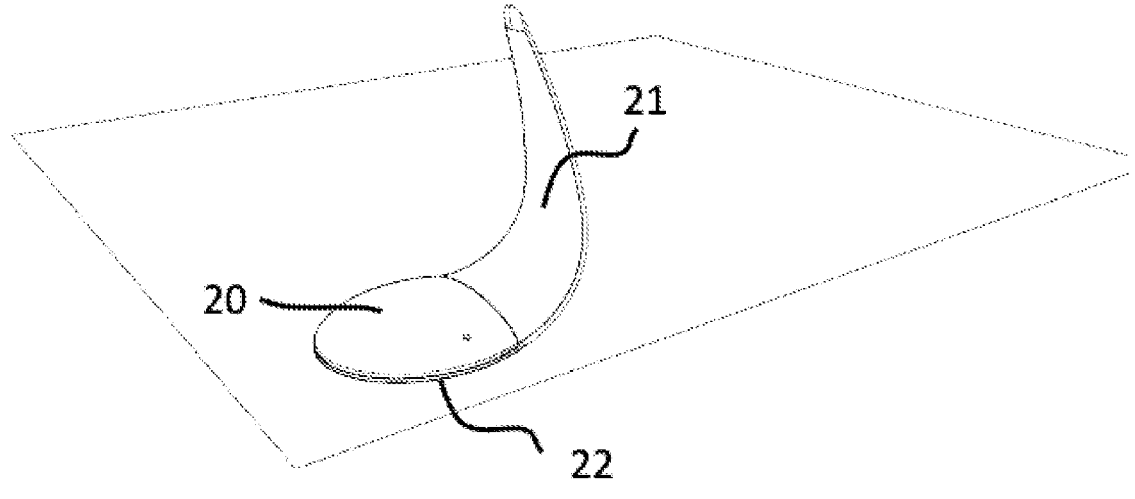
FIG. 6 shows a top view of a separation detection device subjected to flow separation.

FIG. 6 shows a top view of a separation detection device subjected to flow separation, the flexible and deformable strip 21 is then in the raised position. The mounting plate 22 covered by the protective shell 20 and the flexible strip 21 remains glued to the profile.

According to one embodiment, the flexible and deformable strip 21 is made with a silicone elastomer with a Shore value of 30 ShA (example: Silastic, registered trademark).

Figure 7:
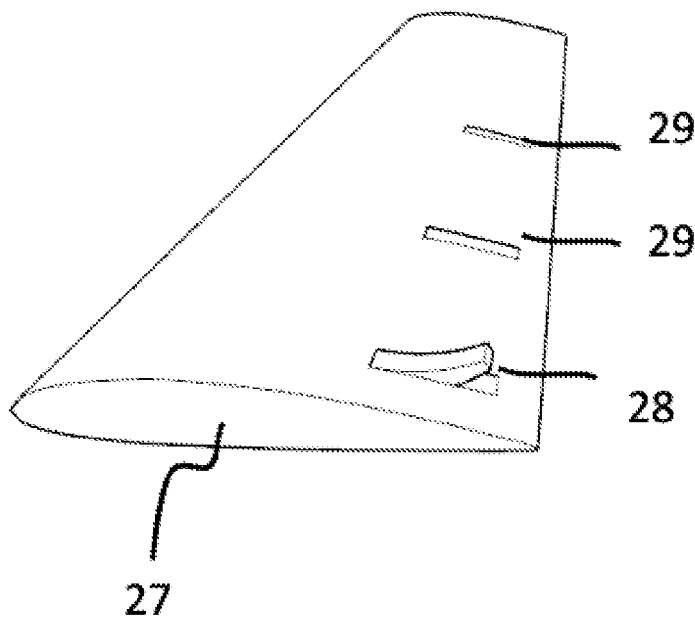
FIG. 7 shows a diagram of an exemplary separation detection device integrated into the profile (aircraft wing).

FIG. 7 shows a diagram of an exemplary separation detection device integrated into the profile 27; the separation sensor is shown in the raised position 28 when the sensor is subjected to flow separation, and the separation sensor is shown in the lowered position 29 when the sensor is not subjected to flow separation.

Figure 8:
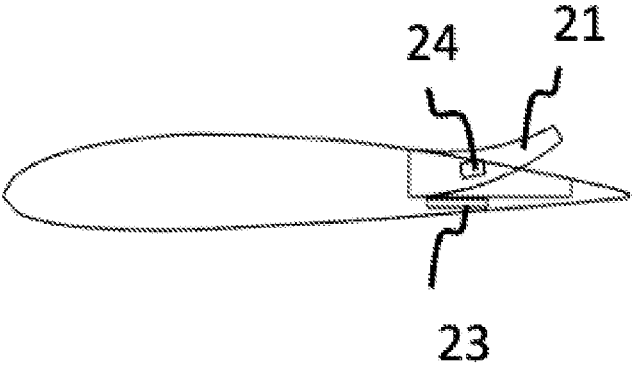
FIG. 8 shows a top view of a separation detection device integrated into the profile.

FIG. 8 shows a top view of a separation detection device integrated into the profile, the flexible and deformable strip 21 is in a raised position when the sensor is subjected to flow separation, or in a lowered position when the sensor is not subjected to flow separation and comprises a magnet 23 that can generate an electrical signal which indicates a separation condition, as well as the separation sensor 24.

Figure 9:
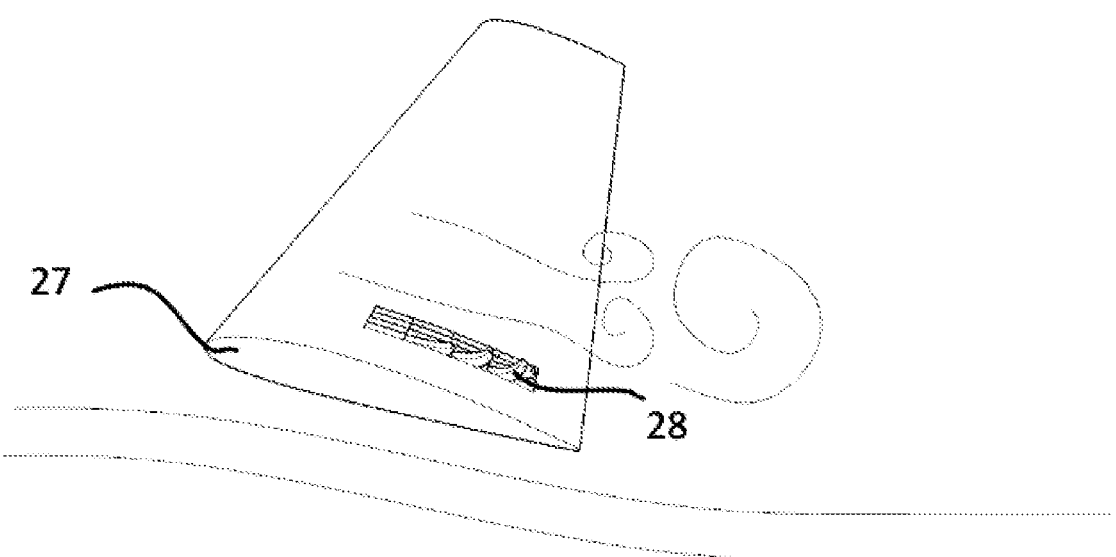
FIG. 9 shows a diagram of an exemplary scale-like arrangement and arrangement integrated into the profile.

FIG. 9 shows a diagram of an exemplary scale-like arrangement integrated into the profile 27. It shows the flexible and deformable strips overlapping one another in the raised position 28. The tail of the sensor, corresponding to the flexible and deformable strip, bends and has a raised position 28, due to the flow separating from the profile. If the separation is great enough, this can lead to a stall.

Figure 10:
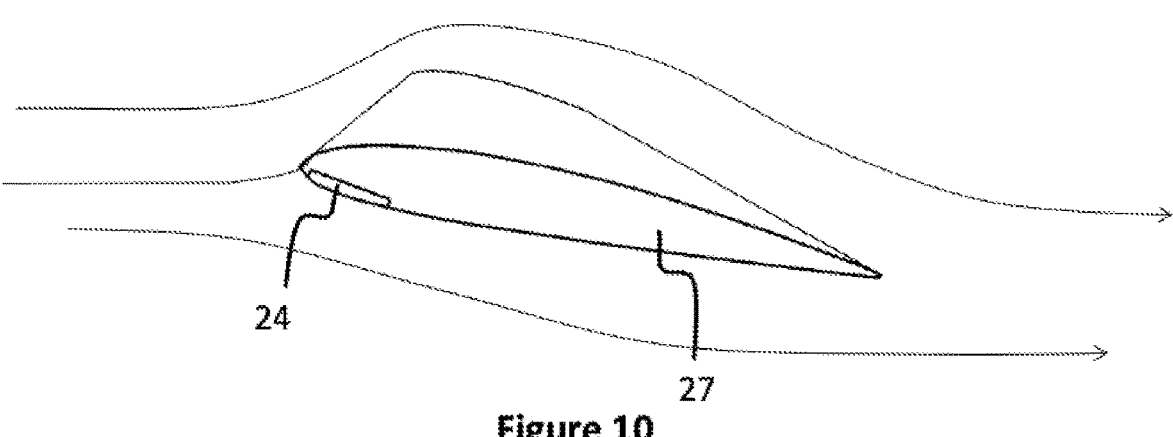
FIG. 10 shows a separation detection device positioned near the leading edge in order to monitor the position of the stop point when there is an absence of turbulence.

FIG. 10 shows a stall detection device positioned near the leading edge of the profile 27 in order to monitor the position of the stop point, the position at which the airflow speed is equal to zero, when there is an absence of turbulence.

The arrows around the profile 27 correspond to the flow of air bypassing both sides of the profile 27 and which opens at the front of said profile before closing at the rear of said profile. The places where the flow of air opens and closes correspond to the separation lines positioned just in front of the stop points.

The aerodynamic profile is located within a flow of air with a suitable angle of incidence, said profile thus has a low incidence.

The aerodynamic/hydrodynamic profile 27 is in zone (a) of FIG. 1, its lift developing linearly with the angle of incidence. The flow is attached. The stop point is upstream of the separation sensor. The position of the separation sensor 24 relative to the leading edge is chosen so as to detect a critical attack angle before stalling.

Figure 11:
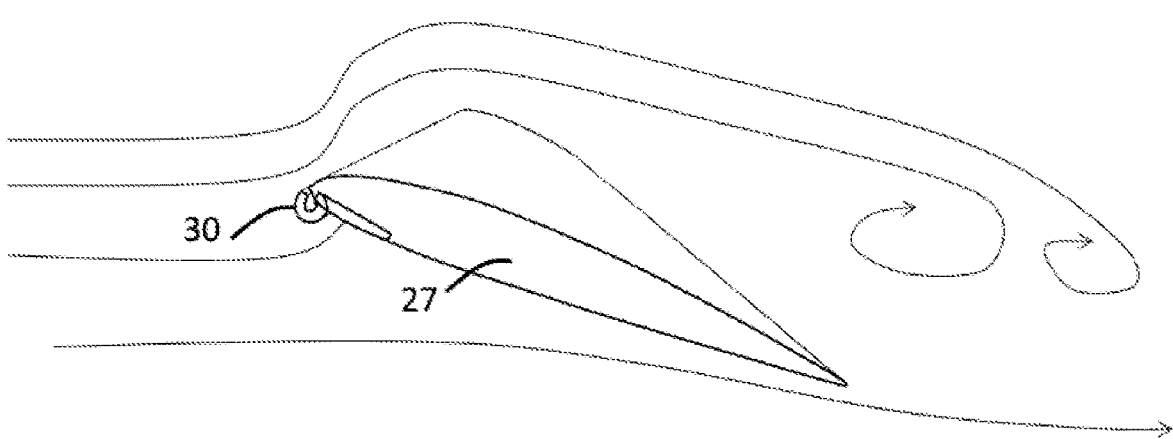
FIG. 11 shows a stall detection device positioned near the leading edge in order to monitor the position of the stop point when there is turbulence.

FIG. 11 shows a device for detecting when an angle of attack, or a critical angle of attack close to the stall angle, is exceeded, positioned near the leading edge of the profile 27 to monitor the position of the stop point when there is turbulence.

The arrows around the profile 27 correspond to the flow of air bypassing both sides of the profile 27. The state of the airflow forms vortices whose orientation and size fluctuate constantly, and is therefore disordered, corresponding to turbulence.

The aerodynamic/hydrodynamic profile 27 has left zone (a) of FIG. 1 to go into zone (b), (c) or (d). The leading edge strip is in a raised position 30. The stop point has thus passed the separation sensor to warn of an imminent stall.

Figure 12:
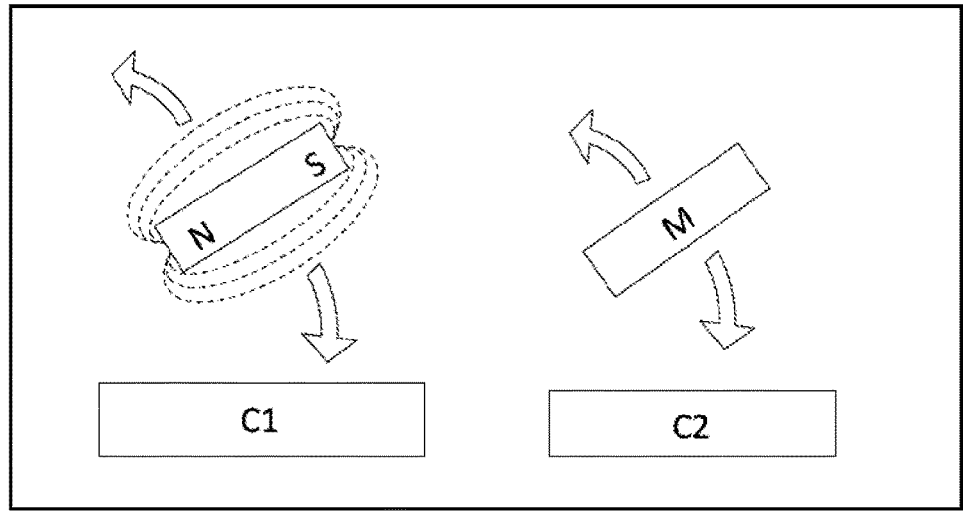
FIG. 12 shows a diagram of the physical operating principle of Hall-effect and inductive sensors.

FIG. 12 shows a diagram of the physical operating principle of Hall-effect and inductive sensors.

The bipolar Hall effect sensor marked C1, sensitive to the north pole (N) and the south pole (S), enables magnetic fields to be detected and measured by exploiting the Hall effect, i.e., the appearance of a force proportional to the electromagnetic field when a conductive element is integrated into this electromagnetic field.

The sensor generates a voltage to measure the current and gives a signal when a magnetic field passes through the profile.

The Hall effect sensor has three independent axes and provides a high degree of accuracy (less than 2%) including temperature compensation.

The inductive sensor, marked C2, also known as an eddy current sensor, consists of a coil which generates a magnetic field to enable detection of variations in the position of the sensor relative to the surface of the metal part (M) placed at the level of the magnetic field.

According to one embodiment, the present invention uses a Hall-effect electromagnetic sensor. According to another embodiment, the present invention uses an inductive electromagnetic sensor.

Figure 13:
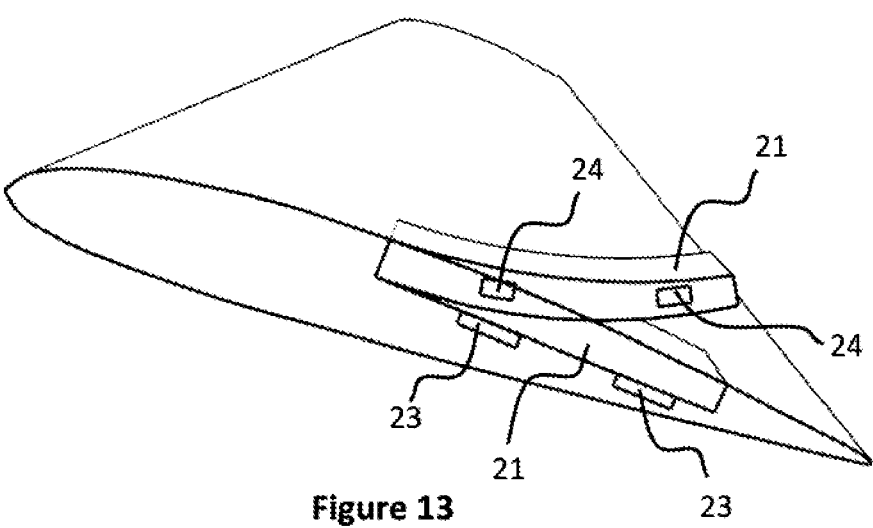
FIG. 13 shows a diagram of the multi-sensor system to describe the curve of the tail in detail.

FIG. 13 shows a diagram of the multi-sensor system to describe the curve of the tail in detail.

According to one embodiment, the present invention has a plurality of devices. Indeed, several magnets 23 and sensors 24 are present within the separation detection device integrated into the profile, the plurality of said sensors 24 provides better accuracy.

Figure 14:
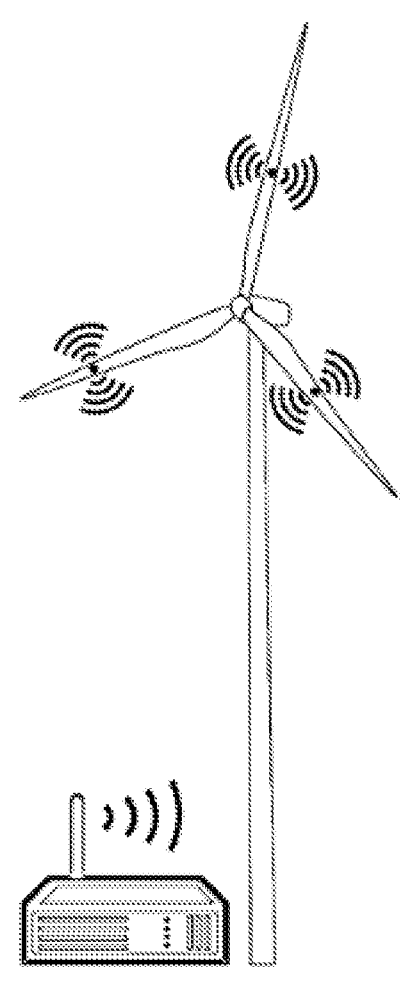
FIG. 14 shows a view of a wind turbine fitted with a wireless radio transmission separation sensor system linked to an acquisition system.

FIG. 14 shows a view of a wind turbine fitted with a wireless radio transmission separation detection device linked to an acquisition system.

The present invention also relates to the profiles such as a wind turbine blade. In this way, the separation sensors positioned on the profile produce a signal transmitted at a frequency that is sufficiently high to describe the physical phenomenon, said signal which is transmitted by radio transmission to a remote receiver is itself connected to a processing system, or acquisition system, enabling data to be recorded, real-time monitoring, the profile to be controlled or the profile to be made safe.

TABLE 1

| LIST OF REFERENCE NUMERALS | |
| --- | --- |
| References | Descriptions |
| 20 | protective shell |
| 21 | flexible and deformable strip |
| 22 | mounting plate |
| 23 | magnet |
| 24 | sensor |
| 25 | circuit board |
| 26 | closure screw |
| 27 | profile |
| 28 | strip in raised position |
| 29 | strip in lowered position |
| 30 | leading edge strip in separated position |

The invention claimed is:

1. Device to detect separation in an aerodynamic or hydrodynamic profile, comprising a one-piece structure comprising:

a flexible and deformable strip made from a silicone material extending between a first end and a second end, the second end being free;

a mounting plate configured to be attached to the aerodynamic or hydrodynamic profile, the mounting plate comprising the first end of the flexible and deformable strip, a circuit board and at least one separation sensor comprising a magnet, the magnet generates an electrical signal indicative of a separation value along three orthogonal axes;

wherein the circuit board attached to the mounting plate transmits the electrical signal by a radio transmission system or a wired connection; and wherein said at least one separation sensor is non-intrusive and detects a flow separation without disrupting a flow and without increasing drag.

2. The device of claim 1, further comprising a battery positioned internally or externally to the device, the battery serving as a power supply and connected to the circuit board.

3. The device of claim 1, wherein the one-piece structure comprises three parts: a first part comprises the flexible and deformable strip, a second part comprises the mounting plate, and a third part comprises a protective shell covering the mounting plate.

4. The device of claim 1, wherein the separation sensor utilizes principles of Hall effect electromagnetism or inductive eddy current.

5. The device of claim 1, wherein the flexible and deformable strip moves from a lowered position to a raised position.

6. The device of claim 1, wherein the silicone material of the flexible and deformable strip has a Shore value between 20 and 100.

7. An assembly comprising a plurality of devices of claim 1.

8. The assembly of claim 7, wherein each device comprises a battery positioned internally or externally to said each device, the battery serving as a power supply and connected to the circuit board of said each device.

9. The assembly of claim 7, wherein the one-piece structure of each device comprises three parts: a first part comprises the flexible and deformable strip, a second part comprises the mounting plate, and a third part comprises a protective shell covering the mounting plate.

\* \* \* \* \*